July 25, 1967  N. D. ROMANOS  3,332,573
WELDED HOOP SEAL FOR REACTOR VESSEL FLANGES
Filed Nov. 18, 1964

INVENTOR.
NICHOLAS D. ROMANOS
BY John F. Carney
ATTORNEY

United States Patent Office 3,332,573
Patented July 25, 1967

3,332,573
WELDED HOOP SEAL FOR REACTOR VESSEL FLANGES
Nicholas D. Romanos, Chattanooga, Tenn., assignor to Combustion Engineering, Inc., Windsor, Conn., a corporation of Delaware
Filed Nov. 18, 1964, Ser. No. 412,028
1 Claim. (Cl. 220—46)

ABSTRACT OF THE DISCLOSURE

A pressure vessel closure arrangement incorporating a flexible, metallic seal ring disposed in a space formed by a counterbored recess in the vessel flange and weldedly attached between the vessel and its closure.

---

Figure 1:
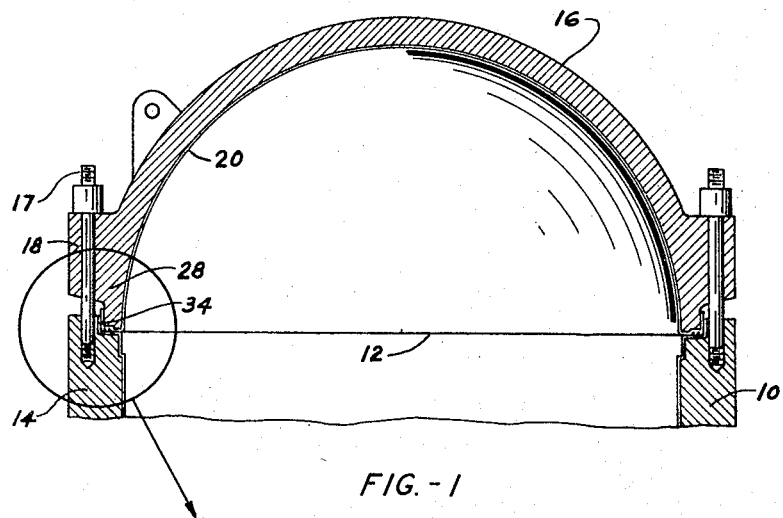

The present invention relates generally to a closure structure for pressure vessels subjected to high internal pressures and temperatures. More particularly, the invention relates to a fluid-tight seal ring applicable to a pressure vessel of the type described between its body and its closure member in order to render the connection therebetween absolutely leakproof.

Pressure vessels are presently being employed in several high pressure, high temperature applications that require vessels of enormous size, oftentimes as large as 15 or more feet in diameter and having wall thicknesses of well in excess of one foot and reinforcement thickness in the area of the closure connection of upwards of two feet. Because of the pressure and temperatures encountered and the types of fluid employed in the process, the pressure vessels must be fabricated from high quality steels and other expensive alloys. Furthermore, due to the nature of the fluids used in many of these applications it is incumbent that any uncontrolled leakage such as would prove hazardous to personnel and equipment be avoided.

It has long been known that a welded seal will provide a positive sealing function capable of providing zero leakage. However, any seal that is employed to prevent leakage around the connection between a pressure vessel and its associated closure member must, of necessity, be capable of absorbing repeated movements experienced in the vessel and closure member flanges due to relative rotations thereof and unequal expansion of the parts due to temperature differentials therebetween. Additionally, it is usually necessary in these organizations that frequent access be had to the interior of the pressure vessel for inspection and maintenance purposes, thereby rendering it necessary to provide a seal that can be readily detached and reestablished to the closure connection.

Therefore, one object of the present invention is to provide a metallic seal around the closure connection between a vessel and its associated closure member that is absolutely leakproof.

Another object of the invention is to provide a flexible seal ring about the connection between a pressure vessel and its closure member that can conveniently withstand any relative movement existing between the two members to which it is attached.

Still another object of the invention is to provide a simple, inexpensive seal ring for sealing the connection between a vessel and its closure member that is efficient in operation and that requires a minimal amount of radial space for attachment to the connected members in order to reduce the amount of material required in the flanges that attach the sealing ring.

Still another object of the invention is to provide a flexible seal ring that occupies a minimal amount of space that permits the threaded fasteners that are employed to connect the members to be placed in a bolt circle of lesser diameter in order to reduce the moments experienced by the flanges in which the fasteners are attached, thus reducing the size of the flanges that are necessary for support of the connectors.

Yet another object of the present invention is to provide an absolutely fluid-tight pressure seal for a pressure vessel closure which can be readily removed and reestablished.

Various other objects and advantages will appear from the following description of one embodiment of the invention, and the novel features will be particularly pointed out hereinafter in connection with the appended claim.

Figure 2:
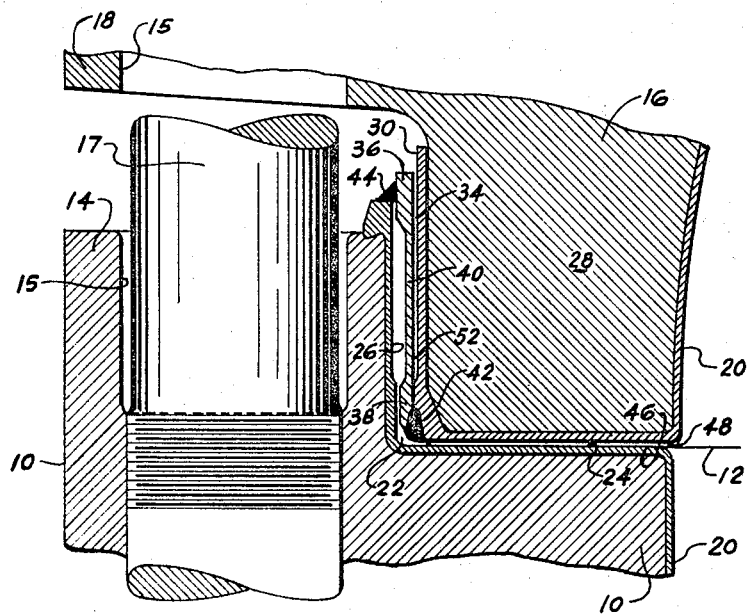

The invention is described with reference to the accompanying drawings wherein:

FIGURE 1 is a partial vertical section of a pressure vessel showing the vessel shell and head in sealed relation; and, FIGURE 2 is a similar view on an enlarged scale of the parts which cooperate to provide the pressure seal of FIGURE 1.

Referring now to the drawings, FIGURE 1 shows the upper end of a vertically elongated, cylindrical pressure vessel 10 having a circular opening 12 in the top thereof. The upper end of the vessel 10 is provided with a reinforced wall section or flange 14 that is adapted to seat a closure member 16. The closure member 16 is of generally hemispherical shape and has an annular flange 18 of increased thickness surrounding its lower end adapted to conform to the vessel flange 14 for closing the opening 12. Circumferentially spaced bolt holes 15 are provided about the flanges 14 and 18 to receive threaded fasteners 17 for securing the closure member 16 to the vessel 10. A corrosion-resisting cladding 20 lines the inner surfaces of the pressure vessel and closure member 16 in order to prevent the accumulation of corrosion products upon the surface.

The flange 14 contains an annular recess 22 that is located inwardly of the bolt holes 15 and that communicates about its circumference with the opening 12 thereby presenting a horizontal seating surface 24 and a substantially vertical wall 26 that faces the opening. The closure member 16 is provided with an annular projection 28 that depends from the lower surface of the flange 18 inwardly of the bolt holes 15. The projection 28 has a lower seating surface 46 that is adapted to seat upon the vessel seating surface 24. The projection 28 also has a vertical dimension that is greater than the depth of the recess 22 thereby causing the flanges 14 and 18 to be spaced when the closure member 16 is in position upon the upper end of the vessel 10. Moreover, the projection 28 is formed with an outer wall surface 30 that is of a diameter that is substantially less than the diameter of the recess wall 26 thereby presenting a space between the two walls when the closure member 16 is in seated relation over the open end of the vessel. Within the space is located an annular seal ring 34 that is weldedly attached to the vessel flange 14 and to the projection 28 in order to present a positive fluid seal between the vessel 10 and closure 16.

The seal ring 34 comprises an elongated, annular band having upper and lower end portions 36 and 38 of a thickness that is less than the width of the space between the walls 26 and 30 yet is capable of supporting a weld. An intermediate portion 40 extends between the end portions 36 and 34 and is of a substantially reduced thickness in order to lend resiliency or flexibility to the seal ring. The use of a flexible membrane permits the seal to withstand maximum pressures. When high pressures are developed within the vessel, differential sheer deflections and rotations are established at the joint of the vessel closure and the seal, being welded at this joint, is thereby subjected to the stresses and relative motion set up therein. However, due to the resiliency of the flexible membrane that forms the seal, these applied stresses and relative movements are easily absorbed. Therefore, the combination of the arrangement of the flexible membrane at the closure joint and its resilient characteristics allow it to withstand maximum internal pressure and the combined differential sheer deflections and rotations without any loss of its sealing ability.

Mounting of the seal ring 34 is accomplished by positioning the ring about the projection 28 with the closure member 16 being removed from the vessel 10. The inner surface of the ring 34 is caused to engage the lower end of the projection 28 at which point a continuous annular weld 42 is provided between the lower portion 38 of the seal ring and the lower end of the wall 30. Thereafter the closure member 16 can be brought into seating engagement over the open end of the vessel with the projection 28 being received in recess 22 and a continuous weld 44 applied between the upper end 36 of the seal ring and the vessel flange 14 about the circumference thereof. After the seal 34 has been weldedly fastened to the vessel flange 14 the studs or bolts 17 are installed in the bolt holes 15 to complete the connection.

As noted in FIGURE 2 the surface of the wall 30 is undercut at 52. The purpose of the undercut is to provide the seal ring with a limited amount of space within which it may deflect. The depth of the undercut 52 is such that the amount of flexure of the ring will not be so great as to cause damage to the ring or the weld 44. Flexure of the seal ring will be effected by the force of the fluid that fills the space between the wall 26 and the outer surface of the seal ring 34. Fluid is permitted to exist in this area due to the presence of a number of circumferentially spaced radial grooves 48 here shown as being located in the seating surface 46 of the projection 28. The purpose of the grooves 48 is to establish fluid communication between the space that surrounds the outer surface of the hoop seal 34 and the interior of the vessel 10 in order that any build-up of pressure behind the seal ring 34 will be prevented. Such a build-up of pressure can be effected when, for example, the vessel is in a cold state and liquid should collect in the space. Thereafter, when the vessel is heated, the liquid would expand and thus establish a build-up of pressure behind the hoop seal. Were it not for the presence of the grooves 48, this build-up of pressure could possibly become so great as to damage the hoop seal or even rupture the weld 44. Because of the presence of the grooves 48 the pressure within this space can never become greater than the operation pressure within the vessel and thus potential damage to the seal is prevented.

By means of the present invention there is provided an effective seal ring 34 that assumes a substantially vertical cross-sectional position between the opened walls 26 and 30 of the vessel 10 and closure member 16, respectively. In this position the seal ring 34 presents the least possible radial dimension between the vessel and closure member thereby reducing the diameter of the bolt circle required for the threaded fasteners 17 employed in the connection as compared with known types of ring seals. This reduction in bolt circle diameter in turn reduces the moment arms between the fasteners 17 and the force reactions that occur between the respective seating surfaces 24 and 46. With the moment arms being thus reduced the moments and stresses experienced by the flanges 14 and 18 are proportionately reduced thus resulting in a reduction in the amount of material required in the flanges for strength purposes thereby reducing the over-all cost of fabrication.

In addition to providing means capable of maintaining a positive seal at the end closure of a pressure vessel, another important feature of the invention is the ease with which the seal may be both installed and removed. During the operation of most pressure vessels of the instant type it is necessary that the closure member be removed at frequent intervals for inspection and maintenance purposes. It is important therefore, that the means used to seal the closure joint be capable of being easily installed and removed. By means of the present arrangement the weld 44 that connects the seal ring 34 to the pressure vessel flange 14 and thus forms the bond between the closure member 16 and the vessel 10 is exposed due to the space that exists between the mating flanges 14 and 18 thereby providing easy access to the weld 44. When it is desirable to break the closure joint all that is required is to remove the threaded fasteners 17 and thereafter cut or otherwise remove the connecting weld 44 in order to break the connection between the seal ring 34 and the flange 14. Once the closure member is removed the weld 42 that joins the seal ring 34 to the projection 28 is readily accessible such that the ring can be removed from the closure member should it be necessary for repair or replacement.

An additional feature of the instant seal is that it can be readily and inexpensively fabricated from bar stock thereby eliminating the need of fabrication by means of dies and machining that would materially increase the manufacturing costs of the seal.

It will be understood that various changes in the details, materials, and arrangements of parts which have been herein described and illustrated in order to explain the nature of the invention, may be made by those skilled in the art within the principle and scope of the invention as expressed in the appended claim.

What I claim is:

In combination, a pressure vessel of circular cross section having an opening in an end thereof; an annular flange integral with said pressure vessel and extending radially outwardly from said opening; an annular recess in said flange presenting a seating surface at the bottom thereof disposed substantially normal to the axis of said pressure vessel, and a wall parallel to the vessel axis spaced from, and facing, said opening; a closure for closing the end of said vessel including an annular flange cooperable with said vessel flange for mutual attachment, an annular projection depending from said closure flange receivable in said recess in seated engagement upon said recess seating surface, said projection having an outside surface spaced from said recess wall to define an axially elongated annular space; an annular seal ring disposed within said annular space comprising a metallic annulus having a substantially I-shaped cross section and its side surfaces in spaced, parallel relation to the walls of said space, said ring including end portions presenting weld surfaces and a straight intermediate portion having a thickness for imparting flexibility to said ring; a first continuous weld attaching the lower end of said ring to said closure and a second continuous weld attaching the upper end of said ring to said flange; and threaded connectors operable through said flanges outwardly of said recess for attaching said closure to said pressure vessel.

References Cited

UNITED STATES PATENTS

| | | | |
|---|---|---|---|
| 2,649,988 | 8/1953 | Campbell | 220—46 |
| 2,818,993 | 1/1958 | Alt | 220—46 |
| 3,127,050 | 3/1964 | McDaniels | 220—46 X |
| 3,225,956 | 12/1965 | Laming | 220—46 |

THERON E. CONDON, *Primary Examiner.*

G. E. LOWRANCE, *Assistant Examiner.*